United States Patent [19]

Yount

[11] Patent Number: 4,866,897

[45] Date of Patent: Sep. 19, 1989

[54] REINFORCED SHEATHING MATERIAL FOR WALL CONSTRUCTION

[75] Inventor: Stanley G. Yount, San Marino, Calif.

[73] Assignee: Fortifiber Corporation, Los Angeles, Calif.

[21] Appl. No.: 42,021

[22] Filed: Apr. 24, 1987

[51] Int. Cl.$^4$ ............................................. F04F 13/04
[52] U.S. Cl. ........................................ 52/363; 52/105; 428/294
[58] Field of Search ................ 52/363, 362, 361, 344, 52/105; 428/294

[56] References Cited

U.S. PATENT DOCUMENTS

| | | | |
|---|---|---|---|
| 1,751,050 | 3/1930 | Nilsson | 52/362 |
| 1,764,428 | 6/1930 | Venzie | 52/361 |
| 2,382,474 | 8/1945 | Gambo | 52/361 |
| 2,919,621 | 1/1960 | Langdon | 52/363 |
| 3,073,066 | 1/1963 | Edwards et al. | 52/363 |
| 3,145,001 | 8/1964 | Bruninga | 52/361 |
| 3,557,515 | 1/1971 | MacCracken | 52/2 E |
| 3,657,853 | 4/1972 | Wise | 52/361 |
| 4,150,184 | 4/1979 | Tesch | 428/294 |

Primary Examiner—Michael Safavi
Attorney, Agent, or Firm—Poms, Smith, Lande & Rose

[57] ABSTRACT

A reinforced composite sheathing paper for use in wall construction between interior framing and exterior materials such as stucco in which a backing sheet of asphalt saturated kraft paper is provided on the interior surface with a plurality of reinforcing bands extending for the length of the paper in spaced parallel relation, each band including a plurality of fiberglass yarns, a thermoplastic adhesive coating each of said yarns and bonding each yarn to said interior side surface whereby each of said bands reinforces said kraft paper and minimizes deflection of said paper during application of stucco to the exterior surface of the sheathing paper. A method of preparing a wall frame construction for application of exterior stucco material including the step of wrapping in one operation the wall frame construction with a longitudinally reinforced backing sheet including reinforcing bands and securing the backing sheet to the studs of the wall frame construction. A composite sheathing paper as mentioned above including scrim fabric bonded to the exterior surface of the sheathing paper at spaced intervals opposite said reinforcing bands.

3 Claims, 3 Drawing Sheets

REINFORCED SHEATHING MATERIAL FOR WALL CONSTRUCTION

BACKGROUND OF THE INVENTION

In wood frame building construction, the exterior walls of such a building usually include vertical wood studs spaced apart a selected distance, vertically spaced horizontal backing wires extending longitudinally along the exterior faces of the studs and attached thereto, a bituminous saturated kraft paper applied over the wire and the exterior faces of the studs, stucco wire netting having relatively large open spaces secured to the studs and loosely overlying the exterior surface of the bituminous paper, and a base coat of plaster or stucco applied to the surfaces of the paper with portions of the chicken wire embedded in the base stucco coat. Present day methods of applying a base coat of stucco include power spraying of the stucco material against the exterior surface of the sheathing paper. The backing wires provide a line contact against the studs and the interior surface of the paper. The backing wire and the paper controls and meters the application of stucco material. A finishing or top coat of stucco or plaster is applied to the base coat after the preliminary rough stucco has dried. In such wall construction the installation of the backing wire, kraft paper, and stucco wire netting are separate installation steps. The stucco wire netting is awkward to handle because of its stiffness and resistance to unwinding from a roll. The normal installation methods for a wall construction involving stucco or plaster are time consuming, material handling is awkward, and labor costs are high.

The wall construction as mentioned above has been in use for many years without major improvements in the wall construction or method of installation thereof. The materials involved have been relatively heavy, difficult and awkward to apply to vertical surfaces, and labor costs in handling such material have been high because of the separate steps of applying the backing wire, applying the sheathing paper, and then applying the stucco wire netting.

SUMMARY OF THE INVENTION

The present invention relates to a novel sheathing means adapted for use in such wall construction. The sheathing and reinforcing means of the present invention eliminates one or more of the steps in such construction of a wall as mentioned above and lends itself to easier handling, installation and less cost.

The primary object of the present invention is to disclose a sheathing means of novel construction particularly adapted for use between an interior material of rigid characteristics and an exterior material applied in a semi-pasty form and becoming relatively rigid upon curing and to provide a rugged weather proof crack-resisting wall.

An object of the invention is to provide a composite reinforcing and sheathing means which comprises a bituminously saturated backing sheet with a plurality of reinforcing bands applied to one surface at intervals of approximately six inches, whereby the composite backing sheet may be readily handled as a unit and provides simultaneous application to the framing of a wall construction of the equivalent of the separately applied backing wire and paper. Thereafter, the composite sheathing paper is firmly stapled to the studding to permit application of the pasty stucco material.

Another object of the invention is to provide a composite reinforcing and sheathing means which when properly applied to a wall construction serves to provide structural strength and resistance to cracking of the exterior weather resistant coating.

A still further object of the invention is to provide a novel composite sheathing means with lightweight reinforcing material so that the sheet may be handled as a labor-saving unit and provide a desired degree of unitized strength and dimensional stability.

A further object of the present invention is to provide a sheet means for a wall construction adapted to be similarly applied to a rigid insulation foam portion of a wall construction.

The invention particularly contemplates a novel composite sheathing means including a backing sheet of saturated paper material which has a desired length and width for wrapping around the exterior vertical framing surfaces of a building wall construction and which has a plurality of reinforcing bands horizontally applied at approximately 6" intervals to the studding side of the composite sheet to strengthen the sheet against deformation or yielding during stucco application. The reinforcing bands have a selected tensile strength and width such as $\frac{1}{2}$ which, when bonded to the paper, reinforces the paper along the length thereof and since there is no separation between the paper and the reinforcing bands, the paper and bands act as a unit and the paper is less subject to bulging or deformation and limits the quantity and dimensions of the stucco material as it is forcibly sprayed there against.

In another example of this invention, a scrim fabric made of flexible scrim filaments of selected tensile strength is attached to the opposite or stucco side of the backing sheet by a plurality of spaced globules of bonding material, whereby the scrim filaments are tentatively attached to the backing sheet and sufficiently separated between the adhering globules to permit meshing with the stucco material to embed the scrim filaments and for reinforcement thereof. After such a composite sheet has been applied to the studding and framing structure and before any stucco work begins, the scrim fabric filaments may be firmly stapled to the framing.

Other objects and advantages of the present invention will be readily apparent from the following description of the attached drawings in which exemplary embodiments of the invention are shown.

IN THE DRAWINGS

Figure 2:
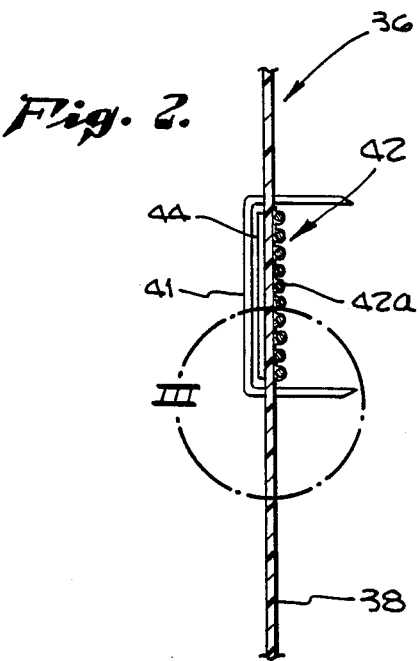
FIG. 2 is an enlarged fragmentary sectional view of the sheathing taken in the plane indicated by line II—II of FIG. 1.
Figure 3:
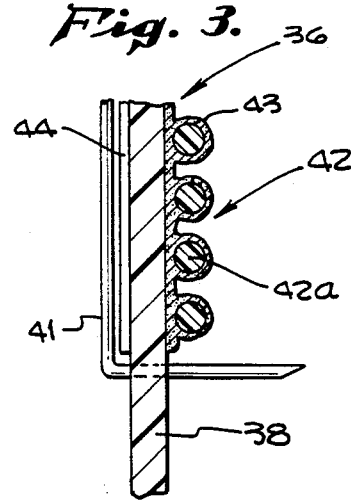

FIG. 3 enlarged fragmentary view of FIG. 2 taken in the area indicated by the phantom line circle III showing the adhesive coating on each yarn and bonding to the paper.

Figure 1:
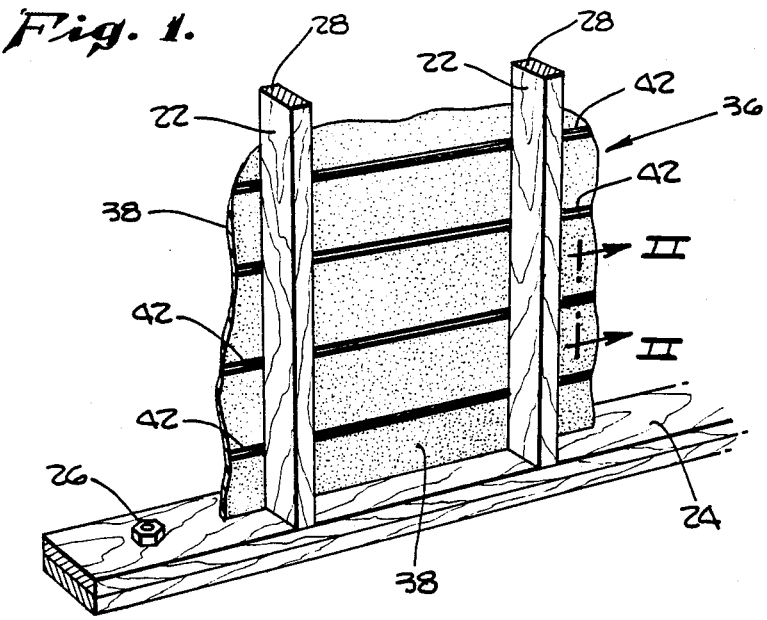
FIG. 1 is a perspective view of a fragmentary wall construction embodying this invention, the view being taken from the interior and showing only the studs and composite paper embodying this invention.
Figure 4:
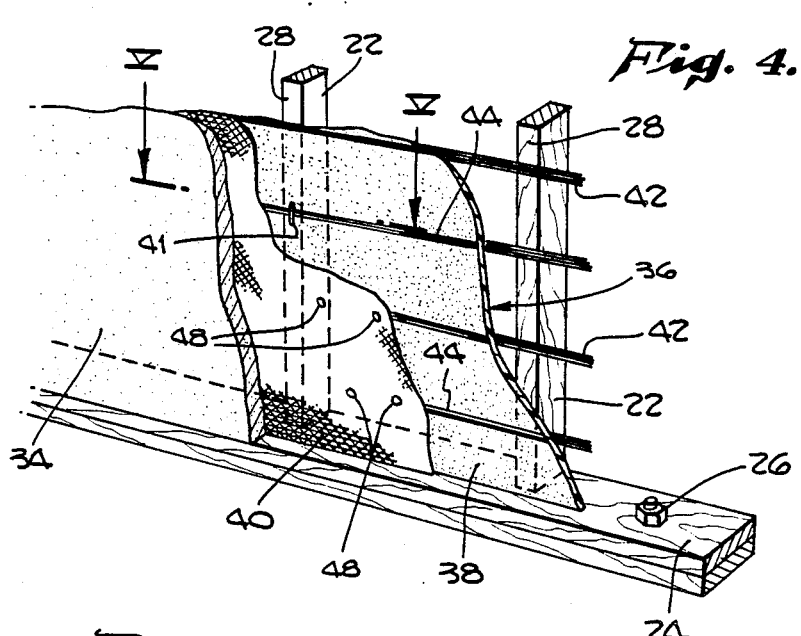

FIG. 4 is a fragmentary exterior perspective view of a wall construction embodying the invention shown in FIG. 1 and including a further embodiment utilizing scrim fabric.

Figure 5:
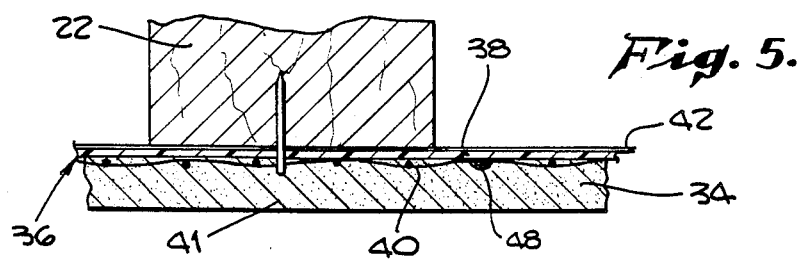

FIG. 5 is a fragmentary enlarged sectional view of the wall construction taken in the plane indicated by V—V of FIG. 4.

Figure 6:
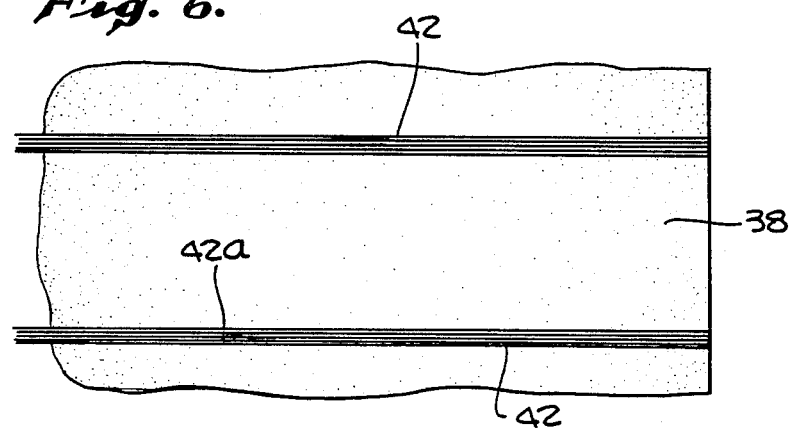

FIG. 6 is a fragmentary enlarged view of the interior surface of composite sheathing means of the present invention.

Figure 7:
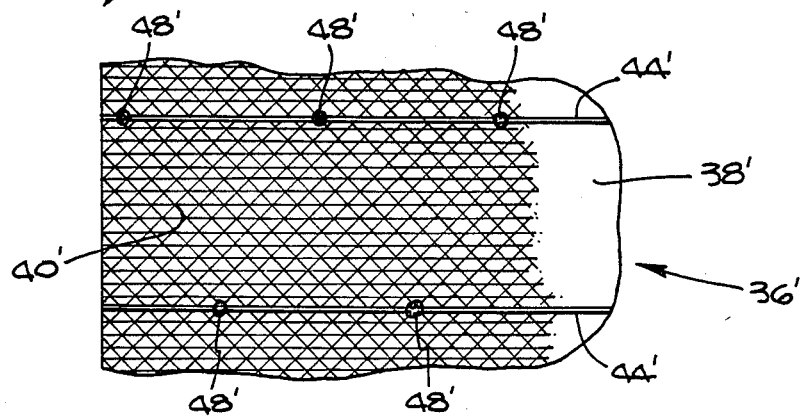

FIG. 7 is a fragmentary view of the exterior surface of the composite sheathing means with scrim fabric.

Figure 8:
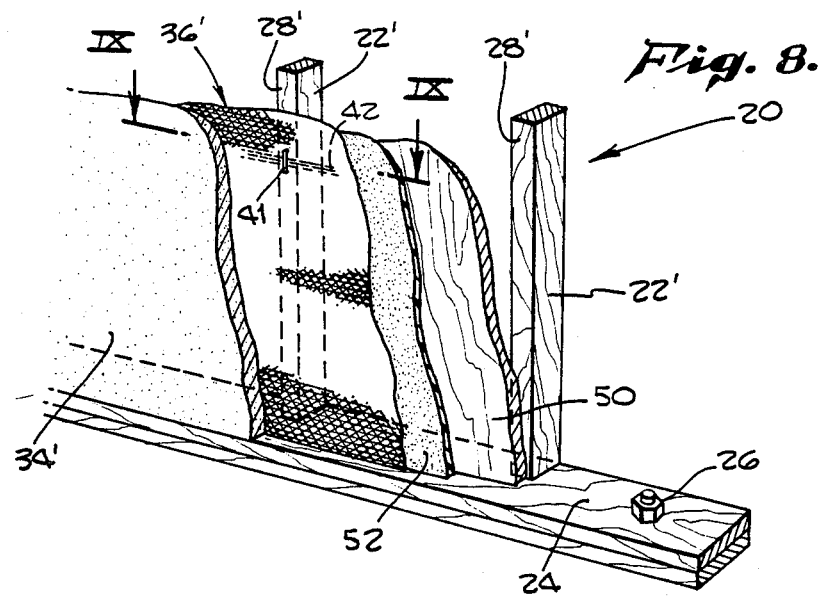

FIG. 8 is a fragmentary perspective view of a different embodiment of a wall construction utilizing the present invention.

Figure 9:
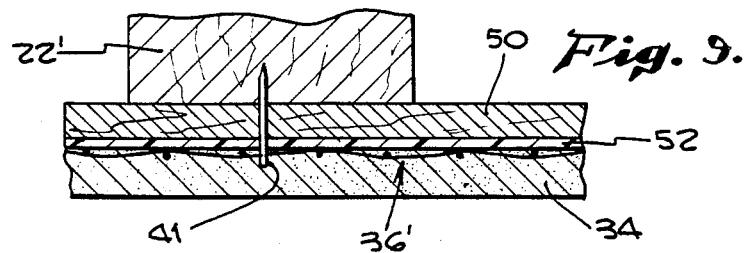

FIG. 9 is a fragmentary sectional view of said different embodiment, the section being taken in the plane indicated by line IX—IX of FIG. 8.

DETAILED DESCRIPTION

In the wall construction generally indicated at 20 in FIG. 1, a typical wood framing of a wall construction may include a plurality of spaced vertical wood studs 22 normally seated and secured by nails to a bottom plate 24 including one or more wood members. Bottom plate 24 may be secured by anchor bolts and nuts 26 to a concrete foundation wall not shown.

In a preferred embodiment of the present invention as shown in FIG. 1 a composite sheathing paper means 36 is employed between the exterior surfaces 28 of studs 22 and exterior stucco material (not shown in FIG. 1). The composite sheathing comprises a lightweight backing sheet 38 which may include a sheet of kraft saturated with bituminous material, an exemplary kraft being of about 26 to 30 pound weight per 1000 square feet and, when saturated, being about 32 to 42 pound weight.

In a preferred example of the composite sheathing means 36, the backing sheet 38 includes an interior surface having a plurality of vertically spaced parallel horizontal reinforcing bands 42 secured and bonded to the interior surface by suitable thermoplastic adhesive material. Each band 42 may comprise a plurality of yarn, threads, or filaments 42a of selected tensile strength, such strands being, for example, made of fiberglass filaments. An exemplary spacing of bands 42 may be approximately 6 inches.

An example of a suitable fiberglass yarn is one identified by length and weight as 3,750 yards per pound of yarn. A suitable selected tensile strength for such a single yarn or filament may be 16.6 pounds per yarn.

Each reinforcing band 42 may comprise a selected number of yarn, in the present example, 10 yarn per band. Tensile strength of each exemplary band 42 is about 166 pounds. It is desired that each band 42 exceed a tensile strength of 142 pounds to assure compliance with building codes for backing wire or the like.

In the fabrication of the composite sheathing means 36, each yarn 42a is coated with thermoplastic adhesive 43 or hot melt such as USI NAI601-00 manufactured by U.S. Industrial Chemicals Co. The coated yarns 42a are machine applied to the surface of backing sheet 38 while the adhesive is hot, each of the 10 yarns lying in parallel planar relation and providing a reinforcing band of about ½ in width. The hot adhesive flows between the parallel yarn 42a and bonds the yarn to the backing sheet and to each other. A unitary integral composite sheathing paper is thus provided.

The thermoplastic adhesive has a ring and ball softening point of about 200° to 220° F. Such a softening point is desired to minimize sticking of adjacent bands when the paper is in roll form and stored under relatively hot climate conditions.

On the exterior surface of the backing sheet 38 may be applied narrow continuous reference strips 44 of different color than the surface of the backing sheet, the strips 44 being directly opposite the bands 42 and parallel thereto, and serve to identify from the exterior side of the backing sheet the location of bands 42. This location reference is for the purpose of securing the backing sheet to the studs 22 at locations of maximum strength of the backing sheet. The reference strips 44 may be applied to the exterior surface as by continuous printing or by spraying suitable color material thereon.

Securement of the backing sheet to the studs 22 may be by suitable fastening means such as staples. As shown in FIG. 2, a staple 41 has a width exceeding the width of reinforcing band 42 and has a suitable length to penetrate a stud for firmly fastening the sheathing to the studs. Embracing of all of the yarn in the band 42 by the staple further unitizes the strength of the band. The backing sheet is secured to studs at a location of maximum strength of the composite sheathing paper.

The composite sheathing means 36, as described, above provides a sheathing paper with unitary integral reinforcing backup bands of suitable strength and bonded to the sheathing paper. As a result, in application of the sheathing paper to a building wall under construction, only one step is required in order to wrap and reinforce the sheathing paper on the wall studs as compared to the separate steps of applying a metal backing wire and a non-reinforced sheathing paper. The advantage of the unitary construction of the reinforcing bands and the sheathing paper also provides enhanced resistance to the application of stucco material against the exterior surface of the sheathing paper by forcible spraying of stucco material against the exterior surface. Since the reinforcing bands are adhesively bonded to the interior surface of the sheathing paper, no relative movement occurs between the reinforcing backup bands 42 and the paper 38 with the result that deformation or inward bulging of the paper 38 during stucco application is minimized. Such minimization of interior bulging of the sheathing paper also results in a saving of stucco material. Further, the sheathing paper, as reinforced with bands 42, may be readily tensioned and applied with the sheathing paper relatively taut.

In the example of the invention shown in FIG. 4, the composite sheathing paper 36 is of the same construction as that described above with respect to FIGS. 1-3. In this example of the invention, a scrim fabric 40 is applied to the exterior surface of the composite sheet means 36. Scrim fabric 40 may include an arrangement of filaments of selected tensile strength and fire resistant characteristics. Since the filaments will be subject to the alkalinity of the stucco material in which the filaments will be embedded, the filaments may be coated with a polyvinyl chloride to provide a protective coating against reaction with the stucco material. Suitable filaments may include fiberglass material of selected tensile strength to provide desired reinforcement of the stucco material. Such fiberglass filaments may be made in mesh or net form in which the filaments may be arranged in horizontal rows lying parallel to the bands 42 and in diagonal rows to provide a desired relatively large mesh opening. The filaments may be laid on top of each other or may be woven and bonded at intersections of filaments. The mesh of the fiberglass filaments may be relatively uniform or haphazardly random in order to provide multi-dimensional strength in multiple dimensions.

Means for attaching such scrim fabric 40 to the exterior surface of backing sheet 38 includes the use of globules 48 of adhesive or bonding material applied at selected intersections of filaments and the adherence of the intersection to the backing sheet at a plurality of selected spaced intervals. In this example, the globules 48 may be applied along the reference strips 44 to assure that the scrim fabric is attached to the backing sheet opposite the reinforcing bands 42 along the lines of maximum tensile strength of the backing sheet. Such attachment of scrim fabric to the backing sheet is readily accomplished by known machines and permits the backing sheet and scrim fabric to be handled as a unit and provided in rolls of selected standard width and length. The space between the globules 48 is selected so that the intervening filaments may be relatively free and separated in spaced relation from the surface of the backing sheet to facilitate introduction of stucco material therebetween.

The application of the composite sheathing means with scrim fabric to the wall construction is relatively easy and rapid because of the lightweight material involved. Further, by one application of the composite sheet means 36 and scrim fabric, the wall construction is in condition for application of stucco material. The separate steps of applying backing wire to the studs, applying a backing sheet to the studs over the backing wire, and the application of stucco wire netting to the exterior surface of the backing sheet are avoided and eliminated in favor of one application and installation of the composite sheet means to the wall construction.

In another example of a wall construction embodying this invention as shown in FIG. 8, the exterior faces 28' of the studs 22' are covered with sheets of plywood 50 of selected thickness and number of plys. The sheets of plywood are nailed to the studs in the usual manner. Against the outer face of plywood 50 may be secured a rigid foam material 52 providing desired "R" factor insulation characteristics for the wall construction. The thickness of the foam insulation material 52 depends upon the type of foam and "R" factor desired. Such rigid foam material may be of polyurethane or polystryene foam having closed cellular structure. Foam material 52 may be secured to the surface of plywood 50 by any suitable means including bonding material or mechanical fastening means.

In this example of the invention, the composite sheet means 36' may be made identical to that described in FIGS. 1-3 and may include the scrim fabric 40 of FIG. 4. Composite sheet means 36' includes a lightweight backing sheet 38' having reinforcing bands 42' on the interior surface of the backing sheet and guide reference strips 44' on the exterior surface of the backing sheet. The scrim fabric 40 is secured to the exterior face of the backing sheet by spaced adhesive globules 48' as in the prior embodiment.

In this example, the composite sheet means 36' is secured to the plywood sheets by means of staples or other fastening means long enough to penetrate the foam 52 and plywood sheet 50.

It will be understood that in this exemplary embodiment of the invention that composite sheet means 36', when applied to a rigid foam covered backing, provides additional strength by the reinforcing bands 42 provided on the interior surface of the backing sheet as described in the prior embodiment. It will also be apparent that the fastening of the composite sheet means to the wall framing need not be precisely opposite a stud of the wall construction because of the use of plywood sheets or panels as a backing for the foam and for the composite sheet means.

Reinforcing band 42 has been shown and described as comprising a plurality of yarn, threads or filaments to achieve a selected tensile strength of band. Where the term "band" is used, it will be understood that the band may include at least one yarn, a strap or ribbon of selected plastic material, a metal ribbon or wire which provides a desired tensile strength and which is attached or bonded to the interior surface of the sheathing paper. The plurality of reinforcing bands 42 attached to the backing sheet and secured by staples to the studs facilitates uniform tensioning of the sheathing paper during installation and contributes to the strength of the building framing.

In the above examples of the invention, the fastening of the composite sheet means to the framing and the scrim fabric occurs at intersections of the fiberglass filaments and at reinforcing bands 42 so that stresses in the composite sheet means occurring during wrapping and during application of stucco are resisted by areas of the sheathing paper of maximum strength.

The composite sheet means of this invention in either type of wall construction described above affords in one installation step the necessary exterior wrapping of the wall framing preparatory to application of stucco and thus saves substantial labor cost and time as compared to prior proposed three-step methods of installation of such wall wrapping.

Various changes and modifications may be made in the composite sheet means in the wall construction which come within the spirit of this invention and all of such changes and modifications coming within the scope of the appended claims are embraced thereby.

I claim:

1. In a wall construction including wall framing having interior support means and an exterior weather resistant material, the combination of:

a backing sheet of asphalt saturated kraft paper having selected length, width and an interior side surface adapted to face said interior support means and having an exterior side surface;

reinforcing bands, each band being of selected width and including a plurality of yarns, extending for the length of the sheet in spaced parallel relation and bonded to said interior side surface and adapted to be horizontally disposed when installed on said interior support means;

a thermoplastic adhesive coating each yarn of a band and bonding said yarn to said interior rise surface, said yarn of each band lying in a common plane parallel to said interior side surface, whereby each band reinforces said kraft paper and minimizes deflection of said backing sheet during application of stucco to said exterior side surface of the sheathing paper, reference lines, each of approximately the same width as one of said bands, applied to said exterior side surface of said backing sheet in parallel and opposite relation to said reinforcing bands on said interior side surface;

and staple means for attaching said composite sheathing paper to said wall framing, said staple means having a span to extend transversely over the width of a reinforcing band to secure each yarn of a band and penetrating said wall framing adjacent opposite longitudinal edges of each of said bands whereby said paper is secured to said framing means at areas of maximum strength.

2. A wall construction as claimed in claim 1 including
a scrim fabric of fiberglass filaments having substantially said same length and width as said backing sheet and extending along the exterior side surface of said sheet;

and means for permanently attaching said scrim fabric to said exterior side surface of said sheet;

said attachment means including globules of adhesive means contacting said scrim fabric and said backing sheet at spaced intervals opposite to said reinforcing bands and along said reference lines whereby said backing sheet and said scrim fabric may be simultaneously fastened to said interior support means and whereby said scrim fabric may be embedded in said exterior material between said globules of adhesive means for reinforcement of said exterior material.

3. A wall construction as claimed in claim 1 including
rigid insulation foam material applied exteriorly of said framing;

said foam material including an outer surface;

and means for attaching said backing sheet to the outer surface of said foam material and to said framing.

* * * * *